US012145494B2

(12) United States Patent
Lee et al.

(10) Patent No.: US 12,145,494 B2
(45) Date of Patent: Nov. 19, 2024

(54) ARTICLE MANAGEMENT SYSTEM

(71) Applicants: Hyundai Motor Company, Seoul (KR); Kia Corporation, Seoul (KR)

(72) Inventors: Sang Heon Lee, Seoul (KR); Dong Eun Cha, Hwaseong-Si (KR); Jin Ho Hwang, Cheonan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 343 days.

(21) Appl. No.: 17/698,089

(22) Filed: Mar. 18, 2022

(65) Prior Publication Data
US 2023/0001841 A1     Jan. 5, 2023

(30) Foreign Application Priority Data

Jul. 2, 2021  (KR) .................. 10-2021-0087070

(51) Int. Cl.
| | |
|---|---|
| *B60P 3/07* | (2006.01) |
| *B60P 1/52* | (2006.01) |
| *B60W 60/00* | (2020.01) |
| *G06Q 10/0832* | (2023.01) |
| *H02J 7/00* | (2006.01) |

(52) U.S. Cl.
CPC .............. *B60P 3/07* (2013.01); *B60P 1/52* (2013.01); *B60W 60/00256* (2020.02); *G06Q 10/0832* (2013.01); *H02J 7/0013* (2013.01); *H02J 2310/48* (2020.01)

(58) Field of Classification Search
CPC ......... H02J 7/0044; H02J 7/0045; B60P 3/07; B60P 3/007; B65G 1/1375; B65G 1/1378
USPC ............................................. 700/223
See application file for complete search history.

(56) References Cited

U.S. PATENT DOCUMENTS

| | | | | |
|---|---|---|---|---|
| 10,654,396 B2* | 5/2020 | Dees | ...................... | B62B 3/10 |
| 10,737,580 B2* | 8/2020 | Aiuchi | ................ | A61G 3/0808 |
| 2014/0205401 A1* | 7/2014 | Bryant | .................... | B60P 3/07 |
| | | | | 414/373 |
| 2019/0329691 A1* | 10/2019 | Crawford | ............. | G05D 1/0088 |
| 2020/0026281 A1* | 1/2020 | Xiao | ................ | G06Q 10/0832 |
| 2020/0209402 A1 | 7/2020 | Abari | | |
| 2020/0342392 A1* | 10/2020 | Godwin | .............. | B65G 1/1378 |
| 2021/0200210 A1* | 7/2021 | Gil | .................... | G06Q 10/0832 |

FOREIGN PATENT DOCUMENTS

| | | |
|---|---|---|
| CN | 108790920 A | 11/2018 |
| JP | 6785742 B2 | 11/2020 |
| KR | 10-2014966 B1 | 8/2019 |

(Continued)

OTHER PUBLICATIONS

Greg Basich, "Infotainment in the Age of the Autonomous Vehicle," 2018; https://www.flashmemorysummit.com/English/Collaterals/Proceedings/2018/2018080 7_AUTO- 101-1_Basich.pdf.

(Continued)

*Primary Examiner* — Glenn F Myers
(74) *Attorney, Agent, or Firm* — Morgan, Lewis & Bockius LLP (57) ABSTRACT

An article management system utilizes an electric cart which may autonomously move, automatically and easily managing articles and ensuring the convenience of delivery service by the automation of article delivery.

13 Claims, 5 Drawing Sheets

(56) References Cited

FOREIGN PATENT DOCUMENTS

| KR | 10-20200112266 A | 10/2020 |
|----|------------------|---------|
| KR | 10-2226685 B1 | 3/2021 |
| WO | WO 2020/209402 A1 | 10/2020 |

OTHER PUBLICATIONS

Nargess Banks, "Tech Start-Up Pix Moving Uses Self-Driving Ideas To Make Flexible Cities," Feb. 2020; https://www.forbes.com/sites/nargessbanks/2020/02/09/autonomous-drive-pix-moving/?sh=6d3ea784104c.

* cited by examiner

ARTICLE MANAGEMENT SYSTEM

CROSS REFERENCE TO RELATED APPLICATION

The present application claims priority to Korean Patent Application No. 10-2021-0087070, filed Jul. 2, 2021, the entire contents of which is incorporated herein for all purposes by this reference.

BACKGROUND OF THE INVENTION

Field of the Invention

The present invention relates to an article management system that automatically and easily manages articles and ensure the convenience of delivery service by automation of article delivery.

Description of Related Art

Recently, mobility vehicles, which may be used in various fields such as freight containers and medical transportation, are being developed. The mobility vehicles having improved energy efficiency have been developed and reached the stage of practical use.

Furthermore, the mobility vehicle has been developed to perfectly perform autonomous driving, and various types of services including delivery services have been available by the mobility vehicles which may perfectly perform the autonomous driving.

To implement the delivery service, a space for sorting and managing articles is required, and an automation system for sorting and managing articles is also required. That is, the articles are classified, based on temperatures, into articles to be stored and handled at room temperature, articles to be stored and handled under refrigeration, and articles to be stored and handled in freeze. Furthermore, the articles are classified, in various ways, into articles highly likely to be damaged, articles having large sizes, and the like. In the present manner, the articles need to be sorted for respective storage conditions. Furthermore, the articles need to be delivered after being sorted by the same storage condition.

Therefore, there is a need to automate article management in a facility for storing and maintaining the articles.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an article management system that automatically and easily manages articles and ensures the convenience of delivery service by automation of article delivery.

Various aspects of the present invention provide an article management system including: an electric cart configured to load an article thereon and provided to be autonomously movable; a cart storage apparatus configured to sort and store the electric cart and charge the stored electric cart with electrical energy; and a controller configured to communicate with the electric cart and control and move the electric cart to a preset destination.

The electric cart may be provided in plural, the plurality of electric carts may be sorted for respective articles and may have different loading functions, and the cart storage apparatus may have storage spaces divided for the respective electric carts having a same loading function.

The electric cart may include: a body portion having a loading space in which the article is configured to be loaded; and electric wheels provided at a lower end portion of the body portion and configured to operate under control of the controller.

An accommodation groove portion may be formed at the lower end portion of the body portion and recessed to accommodate the electric wheel, and the electric wheel may be rotatably provided in the accommodation groove portion such that the electric wheel may be accommodated in the accommodation groove portion when the electric cart is loaded into the cart storage apparatus, and the electric wheel may be supported on a ground surface when the electric cart is unloaded from the cart storage apparatus.

The body portion may have a fixing means configured to selectively fix a rotation position of at least one of the electric wheels.

The body portion may have a sensor unit configured to detect whether the electric cart is moved and loaded into the cart storage apparatus or unloaded from the cart storage apparatus, and the fixing means may release the electric wheel when the sensor unit inputs a signal indicating that the electric cart is loaded into or unloaded from the cart storage apparatus.

The cart storage apparatus may have a storage space for storing the electric cart, a door may be openably and closably provided at an upper end portion of the cart storage apparatus, and a lower end portion of the cart storage apparatus may be formed to catch the electric wheel of the electric cart.

A fixing unit may be provided at the lower end portion of the body portion, and a connection unit may be provided on the cart storage apparatus and configured to be connected to the fixing unit to fix the body portion when the electric cart is loaded and moves to a storage position.

A power source unit may be provided at the lower end portion of the body portion, and a charging unit may be provided on the cart storage apparatus and configured to be connected to the power source unit to provide electrical energy to the power source unit when the electric cart is loaded and moves to a storage position.

The cart storage apparatus may have a roller unit configured to support the electric cart when the electric cart is loaded, and the roller unit may assist in moving the electric cart while rotating.

The article management system may further include: a delivery mobility vehicle configured to autonomously move and having an accommodation space, in which when article delivery to a destination is requested, the controller is configured to control and allows the electric cart loaded with the article to be loaded into the accommodation space of the delivery mobility vehicle and controls and moves the delivery mobility vehicle to the destination.

The article management system structured as described above utilizes the electric cart which may autonomously move, automatically and easily managing the articles and ensuring the convenience of delivery service by the automation of article delivery.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an article management system according to various exemplary embodiments of the present invention will be described with reference to the accompanying drawings.

Figure 1:
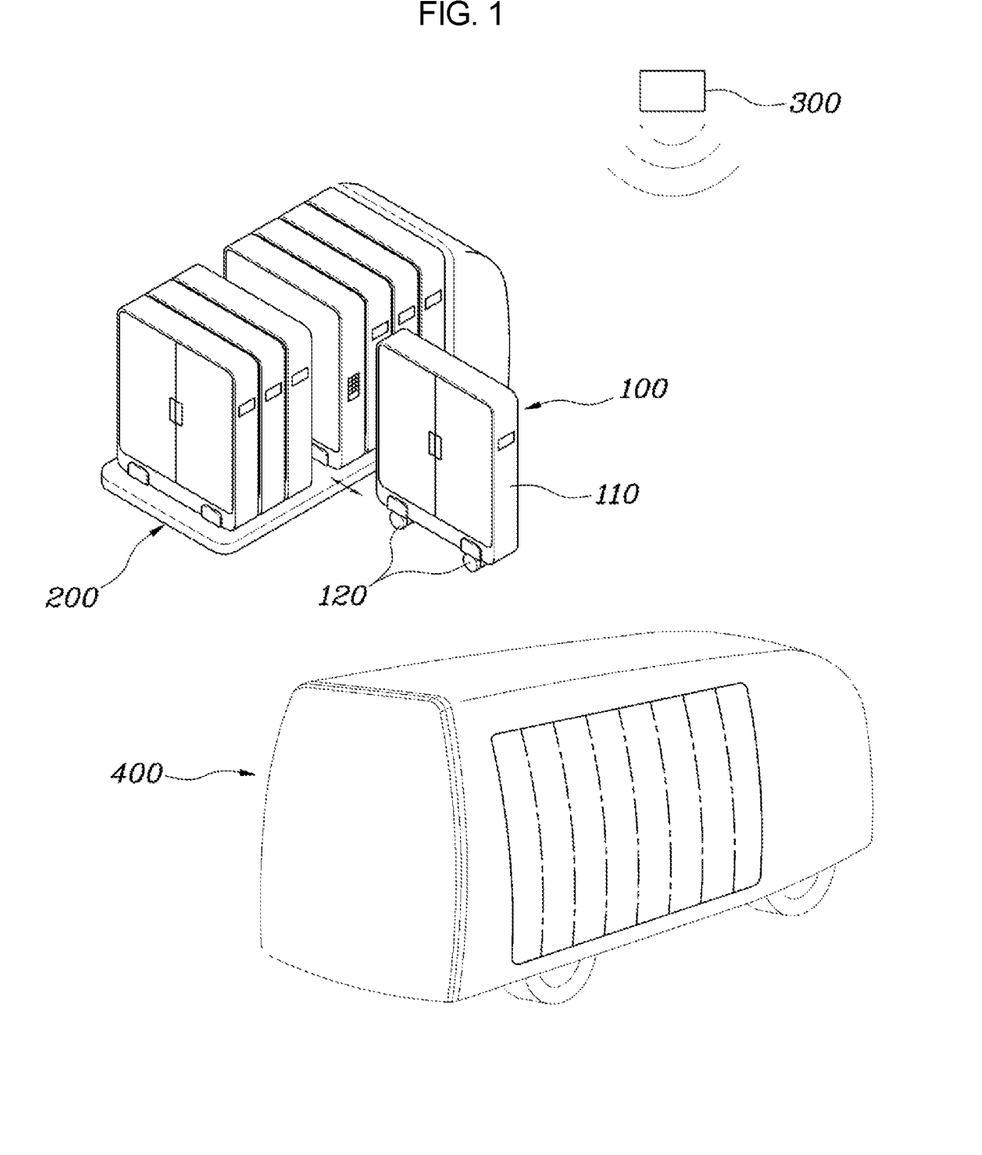
FIG. 1 is a configuration view exemplarily illustrating an article management system according to various exemplary embodiments of the present invention.
Figure 2:
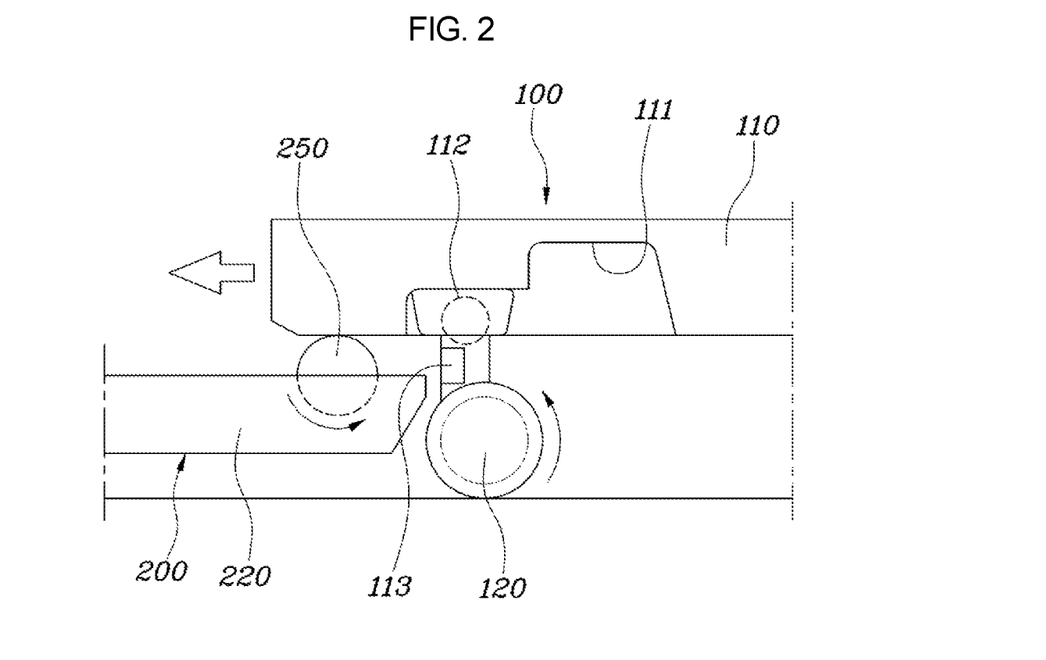
FIG. 2 and FIG. 3 are views for explaining a situation in which an electric cart is loaded into a cart storage apparatus.
Figure 3:
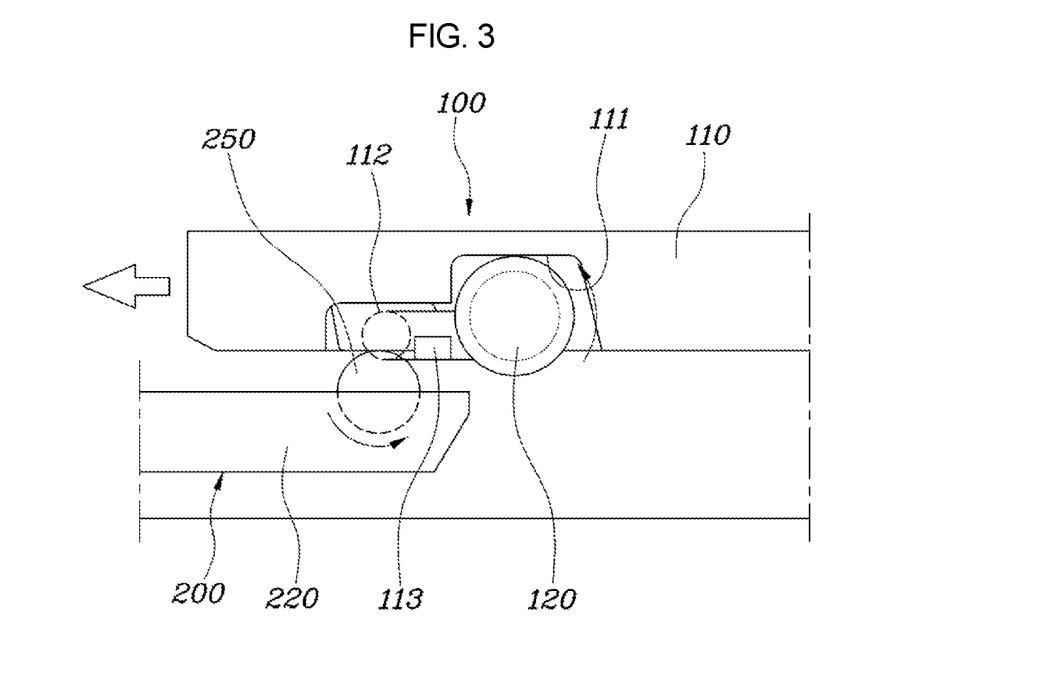
Figure 4:
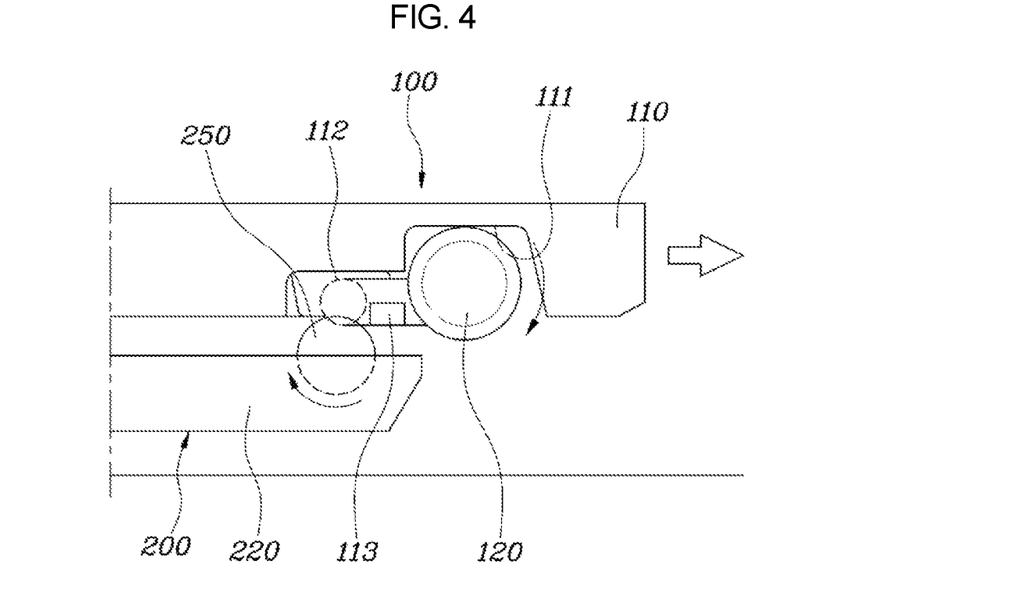
FIG. 4 and FIG. 5 are views for explaining a situation in which the electric cart is unloaded from the cart storage apparatus.
Figure 5:
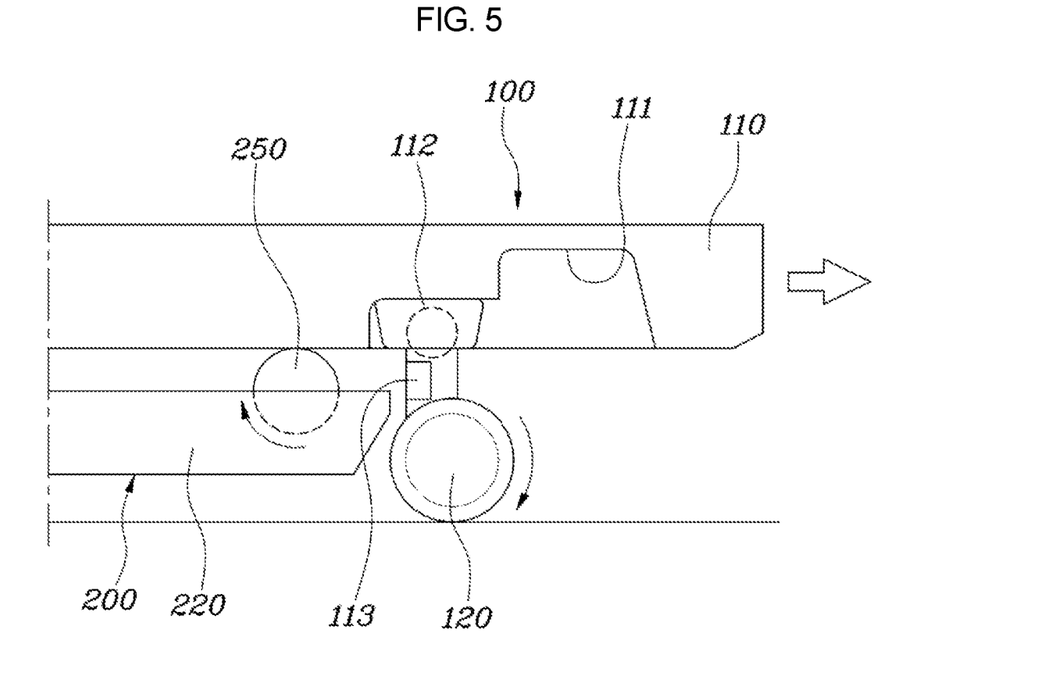
Figure 6:
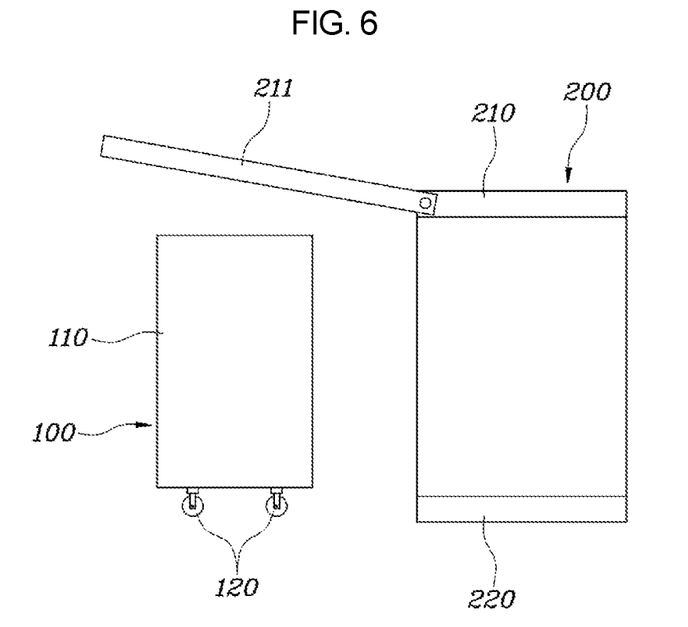
FIG. 6 is a view exemplarily illustrating the cart storage apparatus.
Figure 7:
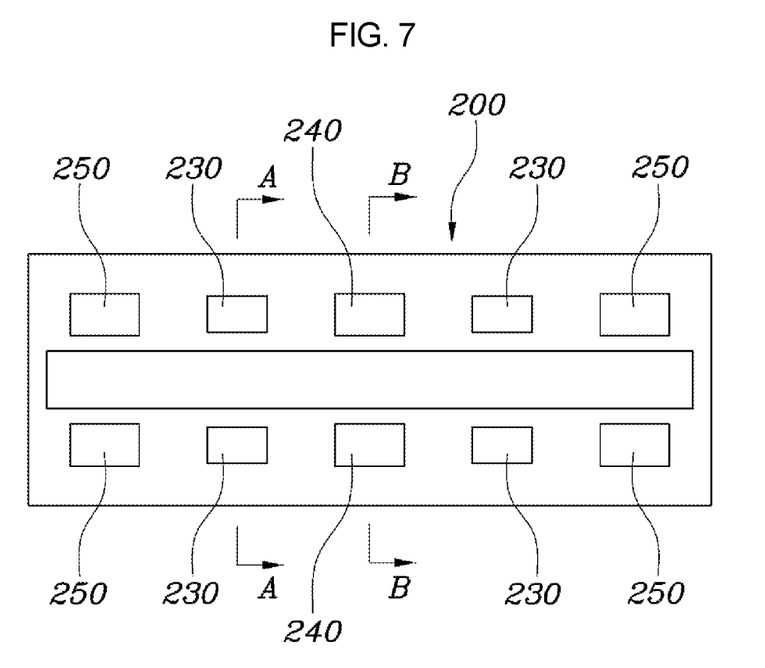
FIG. 7 is a view exemplarily illustrating a lower end portion of the cart storage apparatus.
Figure 8:
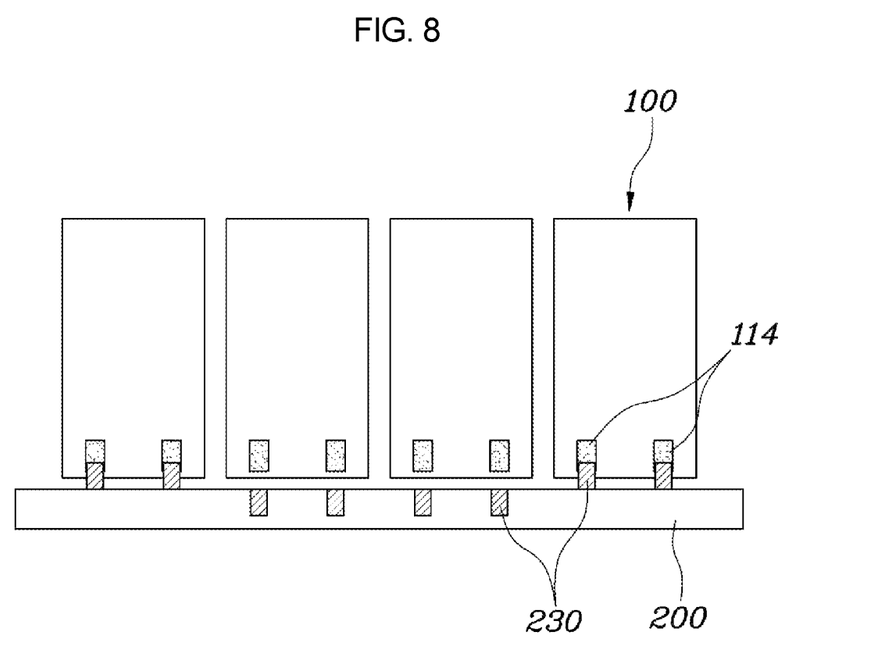
FIG. 8 is a cross-sectional view taken along line A-A for explaining a fixing unit of a body portion and a connection unit of the cart storage apparatus.
Figure 9:
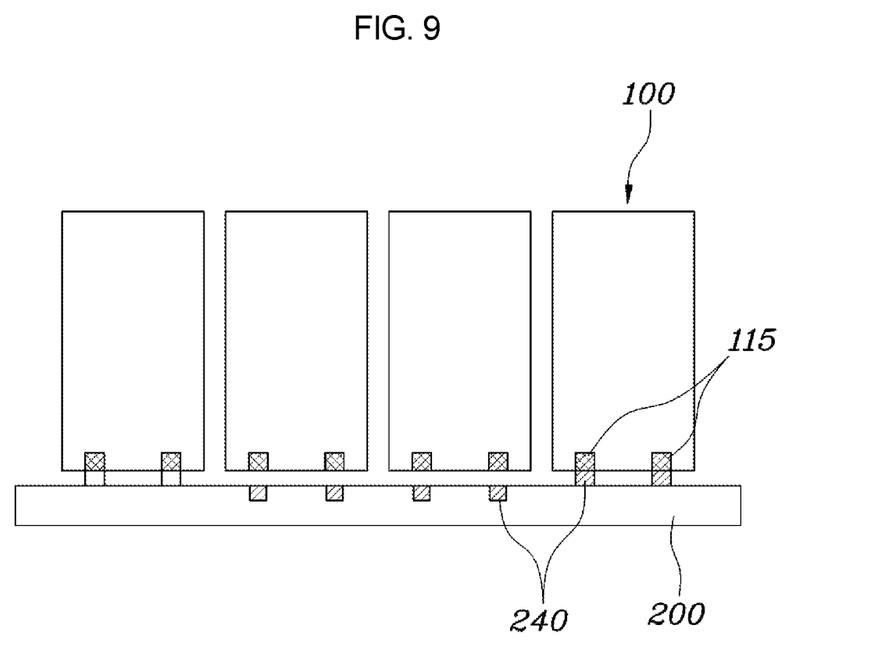
FIG. 9 is a cross-sectional view taken along line B-B for explaining a power source unit of the body portion and a charging unit of the cart storage apparatus.

FIG. 1 is a configuration view exemplarily illustrating an article management system according to various exemplary embodiments of the present invention, FIG. 2 and FIG. 3 are views for explaining a situation in which an electric cart is loaded into a cart storage apparatus, FIG. 4 and FIG. 5 are views for explaining a situation in which the electric cart is unloaded from the cart storage apparatus, FIG. 6 is a view exemplarily illustrating the cart storage apparatus, FIG. 7 is a view exemplarily illustrating a lower end portion of the cart storage apparatus, FIG. 8 is a cross-sectional view taken along line A-A for explaining a fixing unit of a body portion and a connection unit of the cart storage apparatus, and FIG. 9 is a cross-sectional view taken along line B-B for explaining a power source unit of the body portion and a charging unit of the cart storage apparatus.

As illustrated in FIG. 1, an article management system according to various exemplary embodiments of the present invention includes: electric carts 100 configured to load articles thereon and provided to be movable; a cart storage apparatus 200 configured to store the electric carts 100 and charge the stored electric carts 100 with electrical energy; and a controller 300 configured to communicate with the electric carts 100 and control and move the electric cart 100 to a preset destination.

In the instant case, the electric cart 100 may autonomously move and has a space for loading the article. The electric cart 100 may have a specific storage function set according to a condition for storing the article. For example, the electric cart 100 may be configured to adjust a temperature to load an article that requires a specific temperature. Furthermore, the electric cart 100 may be configured to absorb impact so that an article to which minimized impact is applied may be loaded. Alternatively, the electric cart 100 may be configured to divide the space in accordance with the size of the article.

Meanwhile, the cart storage apparatus 200 is configured to sort and store the electric carts 100 and charge the loaded electric carts 100 with electrical energy. That is, the electric carts 100 are sorted and stored in the cart storage apparatus 200, which makes it easy to manage the electric carts 100.

That is, the electric cart 100 is provided in plural, and the plurality of electric carts 100 is sorted for respective articles and has different loading functions. The cart storage apparatus 200 divides the storage space into a space for storing the electric carts 100 having the same loading function and a space for storing the electric carts 100 to be moved to the same location.

Since the plurality of electric carts 100 has different loading functions as described above, it is possible to provide a user with the electric cart 100 that satisfies the condition for storing the article.

Furthermore, the cart storage apparatus 200 is also provided in plural. The storage space includes the space for storing the electric carts 100 having the same loading function and the space for storing the electric carts 100 to be moved to the same location. Therefore, the electric carts 100 are easily managed. That is, the cart storage apparatus 200 may divide the storage space in accordance with the size of the electric cart 100, a stage of charge, a storage environment, a delivery location, and the like. Furthermore, the cart storage apparatus 200 may have special functions such as cleaning or sterilization.

As described above, the plurality of electric carts 100 is sorted in accordance with the loading functions. Therefore, it is possible to store the articles, which are different in storage conditions, may be stored in the electric carts 100, and the articles stored in the electric carts 100 also satisfy the storage conditions. Furthermore, the cart storage apparatus 200 is also provided in plural, and the plurality of cart storage apparatuses 200 stores the sorted electric carts 100, which makes it easy to manage the electric cart 100.

The controller 300 may communicate with the electric cart 100 and control and move the electric cart 100 to a preset destination. That is, the controller 300 allows the electric cart 100 to be moved to and stored in the cart storage apparatus 200 or allows the electric cart 100 to move to a delivery location.

Furthermore, the controller 300 may sort the electric carts 100 into the electric carts 100 having the same loading function and the electric carts 100 to be moved to the same destination. The controller 300 may preferentially move the electric carts 100 positioned at a short distance, improving the efficiency in delivering the electric cart 100.

The electric cart 100 according to various exemplary embodiments of the present invention will be described. As illustrated in FIGS. 1 to 2, the electric cart 100 may include a body portion 110 having a loading space for loading an article, and electric wheels 120 provided at a lower end portion of the body portion 110 and configured to operate under control of the controller.

That is, the electric cart 100 includes the body portion 110 and the electric wheels 120. The body portion 110 has the loading space in which the article is loaded. The body portion 110 may have a specific loading function. In the instant case, the loading function may be a function of adjusting a temperature in the loading space, a function of absorbing impact, a sterilization function, or the like. Different loading functions may be applied to the respective electric carts 100, and the electric cart 100 suitable for storing the article may be assigned.

The electric cart 100 has the electric wheels 120 provided at the lower end portion of the body portion 110. The electric cart 100 is moved by the operations of the electric wheels 120. The electric wheel 120 may be operated by an in-wheel motor and mounted with a steering function that moves the electric cart 100 to a specific position thereof. Furthermore, the electric cart 100 communicates with the controller 300, and the electric wheels 120 operate under control of the controller 300.

Therefore, the article may be loaded onto the body portion 110 of the electric cart 100 and moved as the electric cart 100 is moved to the specific position by the operations of the electric wheels 120.

Meanwhile, as illustrated in FIG. 2, an accommodation groove portion 111, which is recessed to accommodate the electric wheel 120, is formed at the lower end portion of the body portion 110, and the electric wheel 120 is rotatably provided in the accommodation groove portion 111. Therefore, the electric wheel 120 is accommodated in the accommodation groove portion 111 when the electric cart 100 is loaded into the cart storage apparatus 200. The electric wheel 120 is supported on the ground surface when the electric cart 100 is unloaded from the cart storage apparatus 200.

As described above, the accommodation groove portion 111 may be formed at the lower end portion of the body portion 110, and the electric wheel 120 may be rotatably provided and accommodated in the accommodation groove portion 111. of course, the electric wheel 120 may be accommodated in or withdrawn from the accommodation groove portion 111 by a vertical motion instead of a rotational motion. A large installation space needs to be ensured at the lower end portion 220 of the body portion when the electric wheel 120 is configured to perform the vertical motion. Furthermore, when the electric wheel 120 performs the vertical motion, the movement of the electric wheel 120 may be restricted as the electric wheel 120 is caught by the cart storage apparatus 200 when the electric cart 100 is moved and loaded into the cart storage apparatus 200. Therefore, the electric wheel 120 is configured to perform the rotational motion, which allows the electric cart 100 to smoothly enter the cart storage apparatus 200.

Since the accommodation groove portion 111 is formed in the body portion 110 and the electric wheel 120 is rotatably provided in the accommodation groove portion 111, the electric wheel 120 may be accommodated in or withdrawn from the accommodation groove portion 111. Therefore, when the electric cart 100 is loaded into the cart storage apparatus 200, the electric wheel 120 is accommodated in the accommodation groove portion 111 while being rotated. Therefore, the electric cart 100 may smoothly enter the storage space of the cart storage apparatus 200. Furthermore, when the electric cart 100 is unloaded from the cart storage apparatus 200, the electric wheel 120 is rotated to be withdrawn from the accommodation groove portion 111 and brought into contact with the ground surface. Therefore, the body portion 110 may be moved to the specific position by the operation of the electric wheel 120.

In the instant case, a fixing means 112 for selectively fixing the rotation position of the electric wheel 120 may be provided in the body portion 110. The fixing means 112 may be provided on the body portion 110 and connected to a rotation shaft of the electric wheel 120, selectively fixing the position of the electric wheel 120.

For example, the electric wheel 120 may be configured as a drive wheel which is rotated by the motor and the rotation shaft rotatably provided at the lower end portion of the body portion 110. In the instant case, the rotation shaft may be configured to receive an elastic force through a spring and rotate in a direction toward the ground surface. Furthermore, the fixing means 112 may include a fixing pin configured to extend or retracted in a solenoid manner and fix the rotation shaft at a specific position thereof. A structure for changing a rotation position of the electric wheel 120 and a structure for fixing a position of the electric wheel 120 using the fixing means 112 may be variously implemented as long as these structures achieve the same purpose.

Meanwhile, a sensor unit 113 may be disposed on the body portion 110 and detect whether the electric cart 100 is moved and loaded into the cart storage apparatus 200 or unloaded from the cart storage apparatus 200. The sensor unit 113 is provided at the lower end portion of the body portion 110 and detects whether the body portion 110 is loaded into or unloaded from the cart storage apparatus 200. Various sensors such as a contact sensor or a laser sensor may be applied. In various exemplary embodiments of the present invention, the sensor unit 113 is provided at the side of the electric wheel 120 and configured to detect the contact with the cart storage apparatus 200.

Therefore, when the sensor unit 113 inputs a signal indicating that the electric cart 100 is loaded into or unloaded from the cart storage apparatus 200 to the fixing means 112, the fixing means 112 releases the electric wheel 120. That is, when the electric cart 100 is moved and loaded into the cart storage apparatus 200, the sensor unit 113 detects the loading of the electric cart 100 and transmits a signal to the fixing means 112. The fixing means 112 releases the electric wheel 120 so that the electric wheel 120 may be accommodated in the accommodation groove portion 111. Furthermore, when the electric cart 100 is moved and unloaded from the cart storage apparatus 200, the sensor unit 113 detects the unloading of the electric cart 100 and transmits a signal to the fixing means 112. The fixing means 112 releases the electric wheel 120 so that the electric wheel 120 accommodated in the accommodation groove portion 111 is withdrawn from the accommodation groove portion 111 and supported on the ground surface. In the instant case, the signal detected by the sensor unit 113 may be transmitted to the controller 300, and then the controller 300 may input an instruction to the fixing means 112.

Meanwhile, a roller unit 250 is provided on the cart storage apparatus 200. When the electric cart 100 is loaded, the roller unit 250 supports the electric cart 100 and assists in moving the electric cart 100 while rotating. The electric cart 100 may be moved in the storage space by the rotation of the roller unit 250 in the state in which the electric wheel 120 is accommodated in the accommodation groove portion 111 of the body portion 110. In the instant case, the roller unit 250 may be rotated by a separate motor, allowing the body portion 110 of the electric cart 100 to move to a storage position in the storage space.

Therefore, as illustrated in FIG. 2, when the electric cart 100 is loaded into the cart storage apparatus 200, the sensor unit 113 detects the cart storage apparatus 200 such that the fixing means 112 releases the electric wheel 120. Therefore, as illustrated in FIG. 3, the electric wheel 120 of the electric cart 100 is pushed by the cart storage apparatus 200 and accommodated in the accommodation groove portion 111 of the body portion 110. Furthermore, the electric cart 100 may be moved to the storage position by the rotation of the roller unit 250 provided on the cart storage apparatus 200.

Meanwhile, as illustrated in FIG. 4, when the electric cart 100 is unloaded from the cart storage apparatus 200, the sensor unit 113 may detect that the electric cart 100 is moved and unloaded from the cart storage apparatus 200. Therefore, the fixing means 112 releases the electric wheel 120 such that the electric wheel 120 is rotatable. Therefore, as illustrated in FIG. 5, the electric wheel 120 is moved in the direction in which the electric cart 100 is unloaded from the cart storage apparatus 200 such that the electric wheel 120 is rotated toward the ground surface and supported on the ground surface when the electric wheel 120 is separated from the cart storage apparatus 200. Therefore, the electric cart 100 may be moved as the electric wheel 120 rolls.

Meanwhile, as illustrated in FIG. 6, the cart storage apparatus 200 has the storage space for storing the electric cart 100. A door 211 is openably and closably provided at an upper end portion 210 of the cart storage apparatus 200, and a lower end portion 220 of the cart storage apparatus 200 may be formed to catch the electric wheel 120 of the electric cart 100.

Since the door 211 is openably and closably provided at the upper end portion 210 of the cart storage apparatus 200, the electric cart 100, which is loaded into the cart storage apparatus 200, is prevented from interfering with the opened door 211. The door 211 may be opened or closed at the upper end portion 210 of the cart storage apparatus 200 by rotating, sliding, or folding.

When the electric cart 100 reaches the cart storage apparatus 200, the electric cart 100 and the cart storage apparatus 200 identify each other. When the electric cart 100 and the cart storage apparatus 200 normally identify each other, the door 211 is opened so that the electric cart 100 may be stored in the storage space. Therefore, the cart storage apparatus 200 stores only the identified electric cart 100 in the storage space. Therefore, the electric cart 100 is prevented from being stored through an abnormal route, or the entrance of the electric cart 100 caused by an erroneous operation is prevented.

Meanwhile, the lower end portion 220 of the cart storage apparatus 200 is formed to catch the electric wheel 120 of the electric cart 100. That is, the lower end portion 220 of the cart storage apparatus 200 may have a height that catches the electric wheel 120 when the electric cart 100 is moved to be loaded into the cart storage apparatus 200. Since the electric wheel 120 of the electric cart 100 is caught and folded by the lower end portion 220 of the cart storage apparatus 200 when the electric cart 100 is loaded into the cart storage apparatus 200, the electric cart 100 may smoothly enter the cart storage apparatus 200.

Meanwhile, as illustrated in FIGS. 7 to 8, a fixing unit 114 is provided at the lower end portion of the body portion 110, and a connection unit 230 is provided on the cart storage apparatus 200 such that the connection unit 230 is connected to the fixing unit 114 to fix the body portion 110 when the electric cart 100 is loaded and moved to the storage position.

Therefore, the connection unit 230 of the cart storage apparatus 200 is connected to the fixing unit 114 provided at the lower end portion of the body portion 110 when the electric cart 100 is loaded into the cart storage apparatus 200 such that the electric cart 100 may be fixed at the storage position of the cart storage apparatus 200. The fixing unit 114 of the electric cart 100 may be provided in a form of a groove, and the connection unit 230 of the cart storage apparatus 200 may be provided in a form of a pin configured to extend in an upward/downward direction from the lower end portion 220.

The cart storage apparatus 200 may have therein a sensor configured to detect whether the electric cart 100 is positioned at a precise storage position thereof. When the sensor detects that the electric cart 100 is positioned at the precise storage position, the connection unit 230 may be connected to the fixing unit 114 such that the position of the electric cart 100 may be fixed in the storage space.

Meanwhile, as illustrated in FIGS. 7 and 9, a power source unit 115 is provided at the lower end portion of the body portion 110, and the cart storage apparatus 200 has a charging unit 240 configured to be connected to the power source unit 115 and provide electrical energy when the electric cart 100 is loaded and moved to the storage position.

Therefore, when the electric cart 100 is loaded into the cart storage apparatus 200, the charging unit 240 of the cart storage apparatus 200 may be connected to the power source unit 115 provided at the lower end portion of the body portion 110, charging the electric cart 100 with electrical energy. The power source unit 115 of the electric cart 100 and the charging unit 240 of the cart storage apparatus 200 may be configured as power connectors or configured to charge the electric cart 100 in a wireless manner.

At the time of charging the electric cart 100 in the cart storage apparatus 200, the power source unit 115 and the charging unit 240 are used to charge the electric cart 100 in the state in which the electric cart 100 is loaded into the cart storage apparatus 200 and then electric cart 100 is fixed by the connection between the connection unit 230 and the fixing unit 114.

Meanwhile, as illustrated in FIG. 1, the article management system further includes a delivery mobility vehicle 400 configured to autonomously move and having an accommodation space. The delivery mobility vehicle 400 may be an air mobility vehicle that flies by operating a propeller or a mobility vehicle that travels on the ground by rotating wheels. Furthermore, the delivery mobility vehicle 400 may have the accommodation space for accommodating the electric cart 100 and deliver the articles together with the electric carts 100 to the long-distance destination while perfectly autonomously moving.

Therefore, when the article delivery to the destination is requested, the controller 300 controls the electric cart 100 loaded with the articles to load the electric cart 100 into the accommodation space in the delivery mobility vehicle 400 and controls and moves the delivery mobility vehicle 400 to the requested destination.

That is, when the article to be delivered and the delivery destination are determined, the controller 300 allows the electric cart 100 loaded with the requested article to be unloaded from the cart storage apparatus 200.

In the instant case, the controller 300 may primarily sort the electric carts 100 loaded with the same article, secondarily sort the electric carts 100 to be moved to the same delivery destination, and manage the respective electric carts 100.

Furthermore, the controller 300 controls the electric cart 100 to load the electric cart 100 into the delivery mobility vehicle 400 to be moved to the delivery destination and controls and moves the delivery mobility vehicle 400 to the delivery destination, delivering the articles.

In the instant case, the controller 300 checks a movement route at the time of moving the delivery mobility vehicle 400 to the delivery destination so that the delivery mobility vehicle 400 may deliver the articles sequentially from the short-distance delivery destination to the long-distance delivery destination.

The article management system structured as described above utilizes the electric cart 100 which may autonomously move, automatically and easily managing the articles and ensuring the convenience of delivery service by the automation of article delivery.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips.

Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An article management system comprising:
    an electric cart configured to load an article thereon and provided to be movable;
    a cart storage apparatus configured to store the electric cart thereon; and
    a controller configured to communicate with the electric cart and control and move the electric cart to a preset destination,
    wherein the cart storage apparatus has a roller unit configured to support the electric cart when the electric cart is loaded, and the roller unit assists in moving the electric cart while rotating.

2. The article management system of claim 1, wherein the cart storage apparatus is further configured to charge the stored electric cart with electrical energy.

3. An article management system comprising:
    an electric cart configured to load an article thereon and provided to be movable;
    a cart storage apparatus configured to store the electric cart thereon; and
    a controller configured to communicate with the electric cart and control and move the electric cart to a preset destination,
    wherein the electric cart is provided in plural, and the plurality of electric carts is sorted by the controller for respective articles and has different loading functions, and
    wherein the cart storage apparatus has storage spaces divided for the respective electric carts having a same loading function.

4. The article management system of claim 3,
    wherein the controller is configured to primarily sort the electric carts loaded with a same article, secondarily sort the electric carts to be moved to a same delivery destination, and manage the respective electric carts.

5. The article management system of claim 1, wherein the electric cart includes:

a body portion having a loading space in which the article is configured to be loaded; and electric wheels provided at a lower end portion of the body portion and configured to operate under control of the controller.

6. The article management system of claim 5, wherein accommodation groove portions are formed at the lower end portion of the body portion and recessed to accommodate the electric wheels, and the electric wheels are pivotally mounted on the body portion in the accommodation groove portions so that the electric wheels are accommodated in the accommodation groove portions when the electric cart is loaded into the cart storage apparatus, and the electric wheels are supported on a ground surface when the electric cart is unloaded from the cart storage apparatus.

7. The article management system of claim 6, wherein the body portion has a fixing means configured to selectively fix a rotation position of at least one of the electric wheels.

8. The article management system of claim 7, wherein the body portion has a sensor unit configured to detect whether the electric cart is moved and loaded into the cart storage apparatus or unloaded from the cart storage apparatus, and the fixing means releases the at least one of the electric wheels when the sensor unit inputs a signal indicating that the electric cart is loaded into or unloaded from the cart storage apparatus, to the fixing means.

9. The article management system of claim 5, wherein the cart storage apparatus has a storage space for storing the electric cart, a door is openably and closably provided at an upper end portion of the cart storage apparatus, and a lower end portion of the cart storage apparatus is formed to catch the electric wheels of the electric cart.

10. The article management system of claim 5, wherein a fixing unit is provided at the lower end portion of the body portion, and a connection unit is provided on the cart storage apparatus and configured to be connected to the fixing unit to fix the body portion when the electric cart is loaded and moves to a storage position.

11. The article management system of claim 5, wherein a power source unit is provided at the lower end portion of the body portion, and a charging unit is provided on the cart storage apparatus and configured to be connected to the power source unit to provide electrical energy to the power source unit when the electric cart is loaded and moves to a storage position.

12. The article management system of claim 1, further including:

a cart delivery vehicle configured to autonomously move and having an accommodation space, wherein when article delivery to a delivery destination is requested, the controller is configured to control and allow the electric cart loaded with the article to be loaded into the accommodation space of the cart delivery vehicle and configured to control and move the cart delivery vehicle to the delivery destination.

13. The article management system of claim 12, wherein the controller is configured to determine a movement route at a time of moving the cart delivery vehicle to the delivery destination so that the cart delivery vehicle delivers the article sequentially from a short-distance delivery destination to a long-distance delivery destination.

* * * * *